United States Patent [19]

Ishiguro et al.

[11] Patent Number: 4,528,600
[45] Date of Patent: Jul. 9, 1985

[54] EDITING CONTROL SYSTEM

[75] Inventors: Mamoru Ishiguro; Mitsutaka Enomoto, both of Atsugi, Japan

[73] Assignee: Sony Corporation, Tokyo, Japan

[21] Appl. No.: 435,225

[22] Filed: Oct. 19, 1982

[30] Foreign Application Priority Data

Oct. 20, 1981 [JP] Japan .................................. 56-167667

[51] Int. Cl.³ ...................... H04N 5/782; G11B 27/02
[52] U.S. Cl. .................................... 360/14.1; 360/72.1
[58] Field of Search ..................... 360/33.1, 14.1, 14.2, 360/14.3, 72.2, 72.1; 358/335, 903; 369/27, 28, 29, 30, 25

[56] References Cited

U.S. PATENT DOCUMENTS

| 4,145,715 | 3/1979 | Clever .................................. 358/903 |
| 4,254,307 | 3/1981 | Plunkett, Jr. ........................ 369/29 |
| 4,261,021 | 4/1981 | Titus ...................................... 369/27 |
| 4,319,337 | 3/1982 | Sander et al. ......................... 369/29 |

Primary Examiner—Donald McElheny, Jr.
Attorney, Agent, or Firm—Hill, Van Santen, Steadman & Simpson

[57] ABSTRACT

An editing control system having a reel number generator, a plurality of registers for storing editing data including a reel number obtained from the reel number generator, and a control circuit to control the reel number generator when a new cassette is installed into a play VTR.

7 Claims, 3 Drawing Figures

EDITING CONTROL SYSTEM

BACKGROUND OF THE INVENTION

1. Field of the Invention

The invention relates generally to an editing control system, and is directed more particularly to an editing control system suitable for an off-line editing.

2. Description of the Prior Art

A so-called off-line editing system such as disclosed in the U.S. Pat. No. 3,721,757 patented on Mar. 20, 1973 and assigned to the Columbia Broadcasting System, Inc. is utilized in the field of television broadcasting. In this case, since the number of recorded tapes which are used in many, it is necessary that a reel number is designated for each tape and the reel numbers as well as editing information are recorded as data. Therefore, in the prior art system, whenever a new tape is installed into an editing VTR (video tape recorder) an editor inputs a new reel number to the new tape by utilizing ten keys. However, since the editor is busy for other operations, the input of the reel number is frequently forgotten. As a result, a different reel number is recorded as data and accordingly, such an accident results wherein a different or incorrect scene is recorded on the tape upon an on-line edit.

OBJECTS AND SUMMARY OF THE INVENTION

An object of the present invention is to provide an editing control system by which an input of a reel number can be automatically carried out.

According to the editing control system of the present invention, it can be avoided that an editor forgets the above input of the reel number and hence the editor can be intent on his own editing operation.

The other objects, features and advantages of the present invention will become apparent from the following description taken in conjunction with the accompanying drawings through which the like references designate the same elements and parts.

DESCRIPTION OF THE PREFERRED EMBODIMENT

Hereinbelow, the present invention will be described with reference to the attached drawings.

Figure 1:
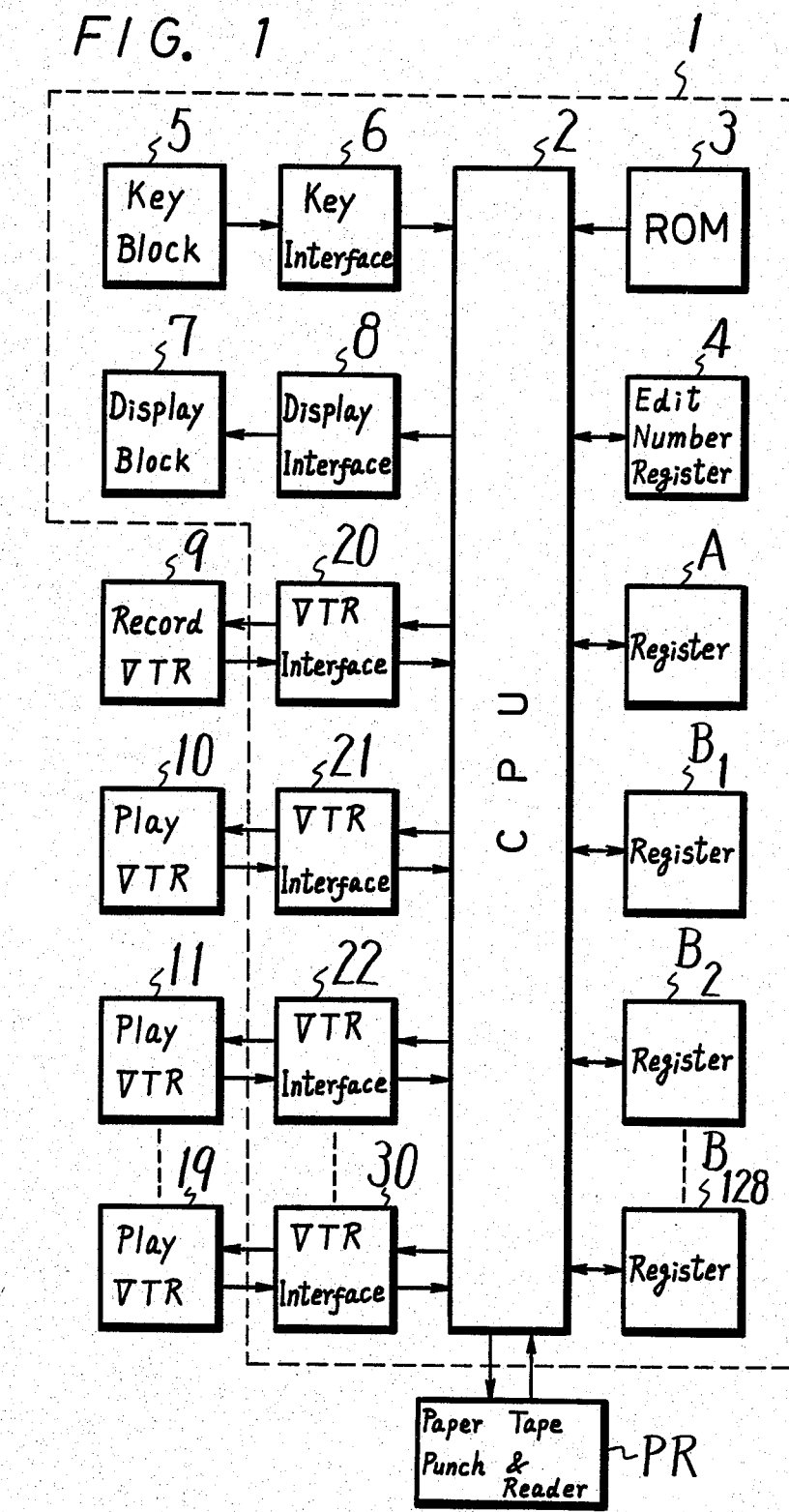
FIG. 1 is a systematic block diagram showing an example of the editing control system according to the present invention.

In FIG. 1 which systematically shows an example of the editing control system of this invention, reference numeral 1 generally designates an editing control unit which includes therein circuits necessary for the editing control, 2 denotes a CPU (central processing unit), 3 a ROM (read only memory) which stores therein soft ware used for controlling the CPU 2, and 4 an edit number register used to store which one of the registers $B_1 \ldots B_n$ serving as a data storage, and corresponding to, for example, 128 events of edit points or in/out points, is accessed to a register A used as a work area.

Registers $B_1, B_2, \ldots B_{128}$ each store a reel number (ordinarily one reel number but upon A/B roll editing two reel numbers), kind of editing modes (assemble editing mode or insert editing mode), kind of sources (for example, VTR and camera), an edit start point or in point and an edit end point or out point in each of the play and record VTRs which relate to the editing, edit start point or in point of an audio signal, and so on. The contents of these registers $B_i$ ($i=1, 2, \ldots, 128$) are accessed in a given case by the register A serving as the work area and then are used for the editing operation. In other words, these registers function as RAMs (random access memory) to read out data stored in a desired register and write data in the desired memory in response to the command by the CPU 2.

Figure 2:
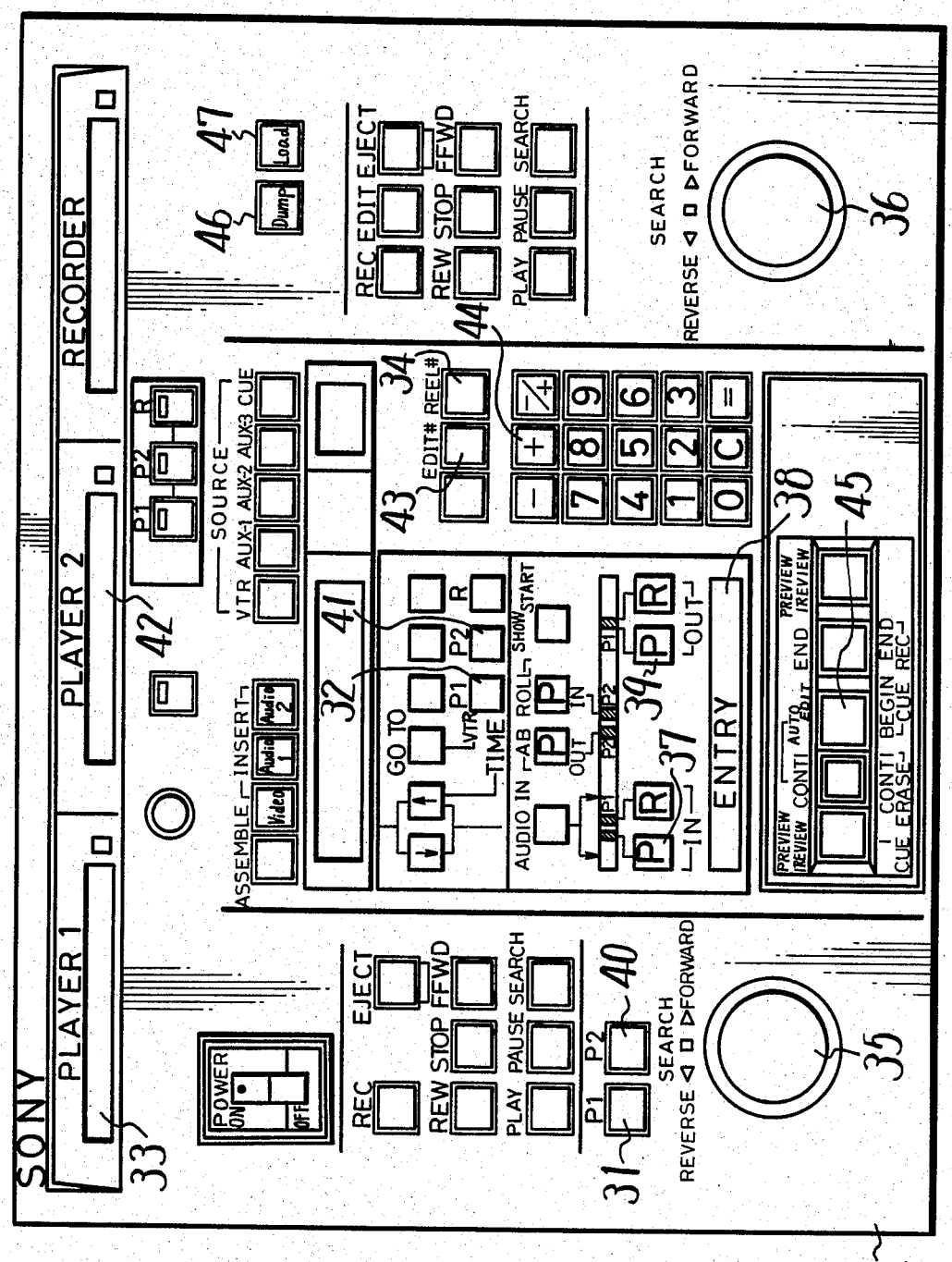
FIG. 2 is a view used to explain the operation panel of the example shown in FIG. 1.

In FIG. 1, reference numeral 5 designates a key block which is used so that the editor generates a command to carry out various kinds of operations shown in FIG. 2. The command by the key block 5 is transferred to the CPU 2 through a key interface 6 as a desired command. Reference numeral 7 designates a display block which consists of a light emitting diode, numeral display tube, and so on to display information such as the reel number, time code or the like necessary to the editing. For this purpose, the display signal is transmitted to the display block 7 from the CPU 2 through a display interface 8.

In FIG. 1, reference numeral 9 denotes a record VTR and 10, 11, ..., 19 each a play VTR. These VTRs 9, 10, 11, ..., 19 are respectively coupled to the CPU 2 through VTR interfaces 22 to 30. As each of the VTRs 9 to 19, a VTR which can record and/or reproduce a signal by using a video tape cassette, for example, VTR type BVO-800 made by the SONY CORPORATION, can be used. Each of the VTRs 9 to 19 comprises a circuit (through not shown) which will detect the insertion and ejection of a cassette and the signals from these circuits are also supplied to the CPU 2 through the VTR interfaces 21 to 30.

Further, reference letter PR in FIG. 1 denotes a paper tape punch and reader for punching out editing data stored in the registers $B_1$ to $B_n$ and for responding to such punch paper tape to control the operation of the CPU 2.

Next, with reference to FIG. 2, a description will be made of the operation of the editing control system according to this invention in which only two play VTRs are used.

At first when a P1 button 31 is pushed down, the play VTR, for example, play VTR 10 (FIG. 1) is selected and the play VTR 10 may be operated by the keys shown on the left side of FIG. 2. When a reel number relating to a tape cassette 10a loaded in the play VTR 10 is inputted, the following process is carried out. First a central P1 button 32 is pushed and thereafter ten keys are operated to input a predetermined number. Then, the number is displayed on a display unit 33 for the play VTR 10. Under such state, if a REEL # button 34 as well as the P1 button 32 are pushed, the reel number at this time is registered in one of the registers $B_1$ to $B_{128}$, for example, register $B_1$. Next, either the ASSEMBLE or INSERT buttons for the editing mode changing -over is pushed, and thereafter search dials 35 and 36 are operated to operate the play and record VTRs 10 and 9 (FIG. 1) to thereby search an optimum IN-point and/or OUT-point. In case of the Insert edit, at first the IN-point is determined and when the VTR 10 is stopped, the address of the tape is displayed on the display unit 33 in the form of a time code. Under this state, if a P-IN button 37 and an ENTRY button 38 are pushed at the same time, the time code at that time is registered on the register $B_1$. Next, when the OUT-point is determined, under the stop state of the VTR 10, the OUT-point address is similarly displayed on the display unit 33. Upon this state, when a P-OUT button 39 and the ENTRY button 38 are pushed simultaneously, the time code of the OUT-point is registered on the register $B_1$. In this case, it may be desired that an SMPTE time code is used as the time code in this case.

After the desired IN/OUT points are decided as described above, when a new tape cassette 10b is inserted into the VTR 10 for a next editing, by a similar operation new reel number, editing mode, and IN/OUT points can be registered on the register $B_2$.

In order to obtain similar editing data on the other play VTR 11, if P2 buttons 40, 41, REEL # button 34, P-IN button 37 and P-OUT button 39 are operated similar to the foregoing manner, the data can be registered in the other register, for example, register $B_3$. In FIG. 2, reference numeral 42 designates a display unit for the play VTR 11.

As to the edit number register 4 (FIG. 1), it is so provided that at every time when an EDIT # button 43 and a "+" button 44 are pushed, the number thereof is incremented. Also, when after the decision of respective edit points an AUTO EDIT button 45 is pushed to perform the editing, the number is also incremented. As a result, at each event a different register is selected.

In case a reel number is inputted by a manual operation, it is sufficient that all data relating to the necessary number of events is repeated to memory, and thereafter the data is delivered by pushing a DUMP button 46 to the paper tape punch and reader PR (FIG. 1) to thereby provide a paper tape. If the paper tape thus provided is used as an input for an editor of another on-line system, on-line editing becomes possible. Further, in this editing control system, it is possible that after the play and record VTRs are replaced by the VTRs for on-line, for example, VTRs of the type BVH-2000 made by the SONY CORPORATION, a LOAD button 47 is pushed to input the data from the paper tape thereto to carry out the editing.

Figure 3:
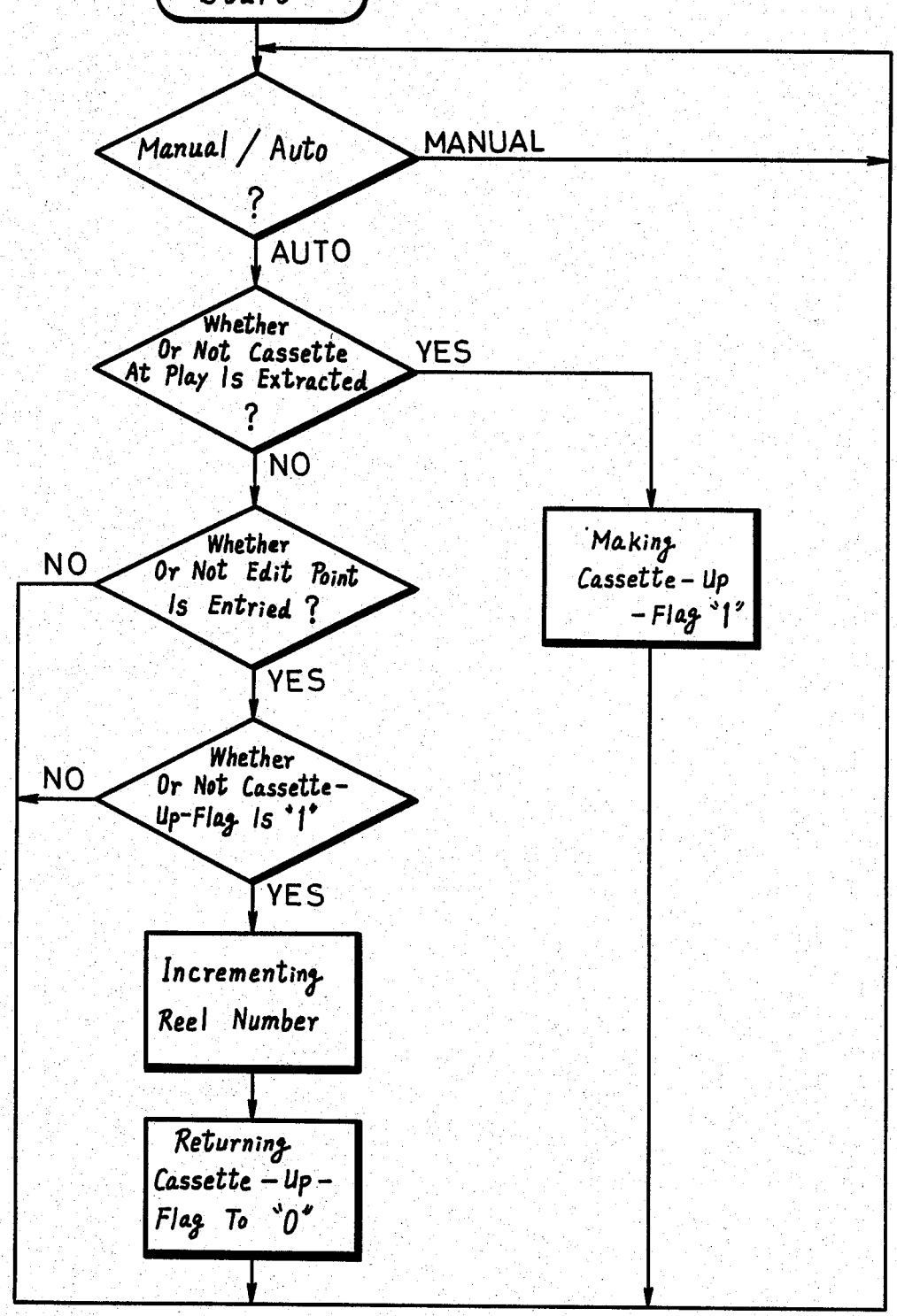
FIG. 3 is a flow chart used to explain the operation of the example shown in FIG. 1.

Now, the automatic reel number designation system according to the present invention will be described with reference to the flow chart of FIG. 3.

When the power is turned on to this system and the tape cassettes are inserted to play VTRs, the CPU 2 automatically sets a cassette of VTR 10 to reel number 001 and a cassette of VTR 11 to reel number 101. Under such a state, by a detecting means which will detect whether or not the reel number is changed by the manual operation of the editor, it is judged whether or not such manual operation is presented. This judgement is carried out by memorizing that the above-mentioned REEL # button 34 together with the P1 button 32 or P2 button 41 has been pushed. When the manual operation is performed, since the automatic feeding of the reel number is unnecessary, it is not carried out. If there is performed no manual operation, by a means for detecting that a tape cassette is ejected and a tape cassette is inserted at the playback side, it is judged whether the cassette at the play side is extracted or not. If the cassette is removed or extracted, a cassette-up-flag is made "1" and the fact that the cassette is removed is memorized. When the cassette is loaded, the edit point is decided further and it is judged whether the edit point is inputted to the corresponding register or not by operating the ENTRY button 38, P-IN button 37, P-OUT button 39 and so on. In this case, since if the editing data is not inputted, no undesirable data is inputted to the register for on-line work, the automatic feeding operation of the reel number is unnecessary and hence it is not performed. When it is detected that the editing data is already inputted, it is judged whether or not the cassette-up-flag is already "1". When the cassette-up-flag is "1", it is judged that the playback cassette is replaced by another cassette and the present reel number at the register to which such edit point is registered is automatically incremented. In other words, when the cassette is exchanged and the next edit point is entered by a different cassette, the reel number at the register is incremented and is then automatically memorized. On the contrary, when the cassette-up-flag is "0", since it is enough that the decision of the edit point on the cassette same as that on which the edit point deciding operation before one is preformed is memorized, the automatic feeding of the reel number in the register is not necessary and hence no automatic feeding is carried out. In this case, when the reel number is automatically fed, the cassette-up-flag which is the memory of whether or not the cassette is exchanged is returned to "0" again. That is, under the above state that the power is turned ON, when the editing points as edit number 1 are entered in the register $B_1$, the cassette-up-flag is "0", so that the reel number 001 is memorized as it is. Next, when the cassette of the VTR 10 is ejected and exchanged by a new cassette, the cassette-up-flag becomes "1" first and then memorized. In this state, when the editing points as the edit number 2 are determined and the entered in the register $B_2$, the reel number is incremented in accordance with the above flow and the reel number 002 is memorized in the register $B_2$. As to the VTR 11, the above is similarly applied thereto, but the reel number is of course incremented as 102, 103.

By the above arrangement, the editor becomes free of troublesome operation and every time when a cassette is exchanged its reel number is inputted, and hence the efficiency is improved. Further, the mis-editing caused by the fact that the input of a reel number is forgotten as in the prior art, can be avoided by this invention.

Although in the above example, after the input of the reel number is manually carried out even once, and the automatic operation is not performed, another modification may be possible. For example, even though the reel number is manually inputted, when it is detected that thereafter the cassette is exchanged, the operation may be changed to the automatic operation if no manual input is carried out thereafter. Further, it is needless to say that the increment of the reel number is not limited to one by one.

The above description is given on a preferred embodiment of the invention, but it will be apparent that many modifications and variations could be effected by one skilled in the art without departing from the spirits or scope of the novel concepts of the invention, so that the scope of the invention should be determined by the appended claims only.

We claim as our invention:

1. An editing control system, comprising:
   a record VTR connected to record a video signal reproduced from one of a plurality of play VTRs, each of said play VTRs using a video tape cassette and having switch means for detecting insertion and ejection of a tape cassette, editing control means for controlling said record and play VTRs, said editing control means having a plurality of register means for respectively registering editing data including at least a reel number corresponding to the cassette used for editing, and flag data representing insertion and ejection of said tape cassette, means for detecting an entry of said editing data, means for manually incrementing said reel number, means for detecting an absence of manual incrementing of said reel number, means for automatically incrementing said reel number in response to said flag data and a signal from said means for detecting an entry of the editing data, and means for changing said flag data after incrementing of said reel number.

2. An editing control system according to claim 1 further comprising means for manually changing the reel number.

3. An editing control system according to claim 2 further comprising detecting means for detecting the fact that the reel number is manually changed.

4. An editing control system according to claim 3 further comprising means for preventing operation of said means for controlling by an output from said detecting means.

5. An editing control system as claimed in claim 1 wherein said means for controlling increments the reel number.

6. An editing control system according to claim 1 further comprising means for automatically designating different reel numbers to said plurality of VTRs.

7. An editing control system according to claim 1 including means for displaying said editing data including a reel number on a sheet.

* * * * *